Figure 1:
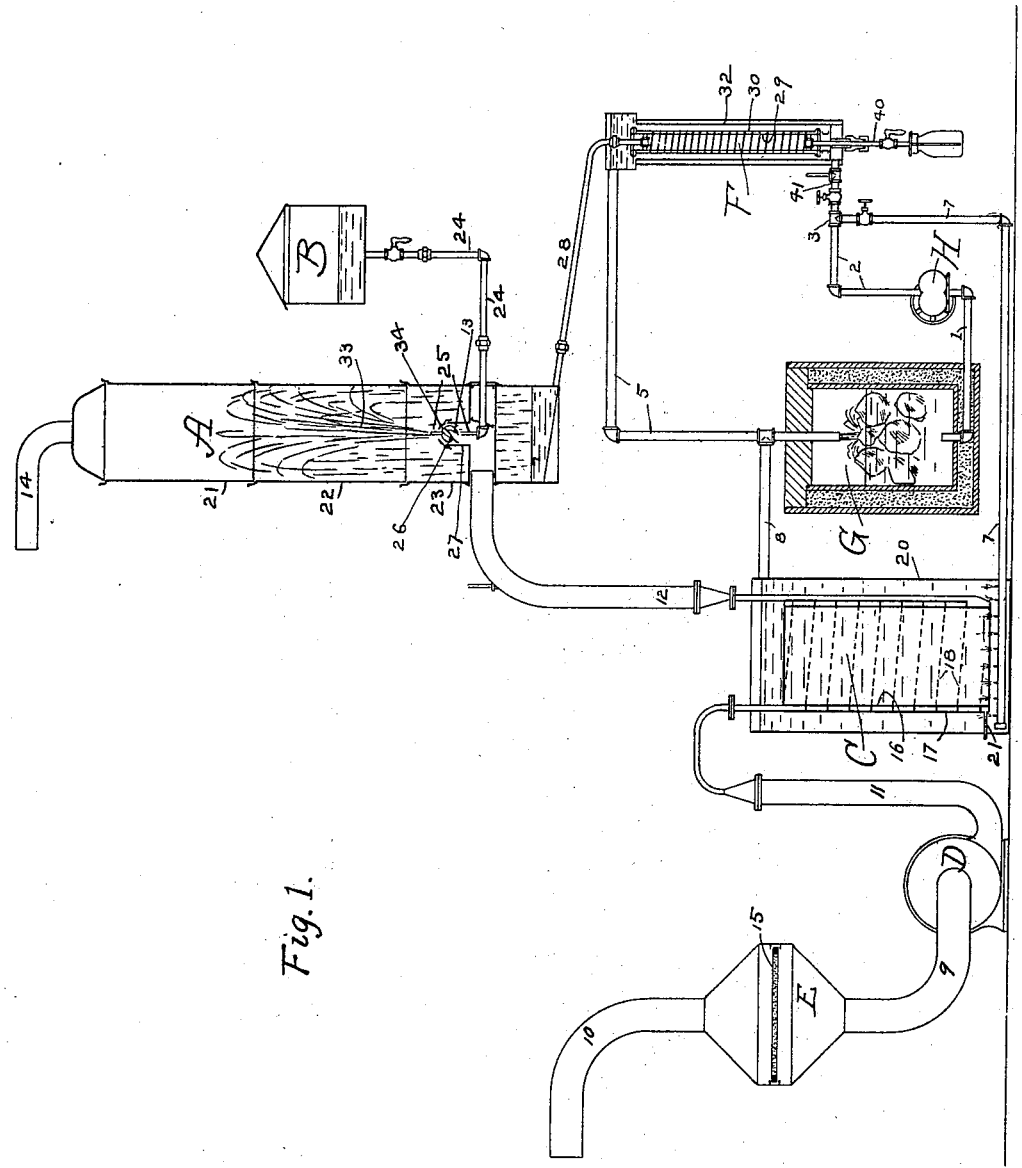

No. 626,673.  
D. P. COX.  
MILK COOLER AND AERATOR.  
(Application filed June 24, 1898.)  
(No Model.)

Patented June 13, 1899.

2 Sheets—Sheet 1.

WITNESSES:  
INVENTOR  
David P. Cox,  
BY  
ATTORNEY.

No. 626,673. Patented June 13, 1899.
D. P. COX.
MILK COOLER AND AERATOR.
(Application filed June 24, 1898.)

(No Model.) 2 Sheets—Sheet 2.

WITNESSES:
William R. Traill
R. D. Riley

INVENTOR
David P. Cox,
BY
W L Ames
ATTORNEY.

UNITED STATES PATENT OFFICE.

DAVID P. COX, OF TERRE HAUTE, INDIANA.

MILK COOLER AND AERATOR.

SPECIFICATION forming part of Letters Patent No. 626,673, dated June 13, 1899.

Application filed June 24, 1898. Serial No. 684,428. (No model.)

*To all whom it may concern:*

Be it known that I, DAVID P. COX, a citizen of the United States, residing at Terre Haute, in the county of Vigo and State of Indiana, have invented certain new and useful Improvements in Milk Aerators and Coolers, of which the following is a specification.

My invention relates to improvements in devices for aerating and cooling liquids in which a current of cold air is brought into intimate contact therewith; and the object of my improvement is to provide a simple and complete apparatus therefor particularly adapted for the aerating and cooling of milk.

It is well known that milk properly aerated and cooled is improved thereby and many devices have been used for the purpose of so treating it. In most cases one of two methods has been employed—first, the forcing of atmospheric air to the bottom of a receptacle containing the milk and causing the air to bubble up through the liquid, escaping at the surface, or, second, causing the milk to fall in thin streams through atmospheric air. In some variation of these methods a current of air has been caused to impinge against a thin stream of milk. These methods are faulty from the fact that but a comparatively small part of the milk comes in actual contact with the air unless the operation be very long continued, which is undesirable.

In the aerating and cooling of milk the results will be more or less satisfactory according as the following conditions are fulfilled:

(*a*) The milk should be treated as soon as practicable after being obtained from the cow and while warm. Milk warm from the cow is in the best possible condition for receiving and developing bacteria; hence the evident advantage of prompt cooling; also, if the milk is allowed to cool previous to aerating odors will be condensed and absorbed and not readily removed thereafter.

(*b*) In the process of aerating the milk should be in a finely-divided state in order that each particle thereof should come in contact with the air.

(*c*) In producing this finely-divided condition violent agitation of the milk should be avoided—that is, such methods as spurting the milk through fine holes or dashing it against screens are harmful, as resulting in breaking up the fatty globules, which would otherwise rise as cream, and releasing the butter-fats, thus injuring the milk for the ordinary domestic purposes.

(*d*) After the cold air used in aerating has come in contact with the milk it should be conducted away as soon as practicable in order that the milk now being partially cooled will not absorb the odors it is desired to remove.

(*e*) The aerating and cooling apparatus should consist of few parts of simple form and readily accessible in order that all portions thereof with which the milk comes in contact can receive the thorough and certain cleansing which is absolutely necessary in the proper treatment of milk.

The conditions above stated are fully met by my improved apparatus, which is hereinafter described in connection with the accompanying drawings.

Figure 1 represents the general arrangement of my improved apparatus, A being the aerator, consisting of an aerating-chamber and an atomizer with air and milk supply pipes. B is the milk-receiver, in which the fresh milk is placed preparatory to aerating. C is an air-cooler for reducing the temperature of the air supplied to the aerator A. D is a blower which draws air through the filter E, forces it through the cooler C, and delivers it filtered and cooled at the aerator A at the pressure desired. F is a milk-cooler, forming a part of the milk-delivery system from the aerator. G is a tank containing water and ice, the water therefrom being circulated through the air and milk coolers by means of the pump H.

Figure 2:
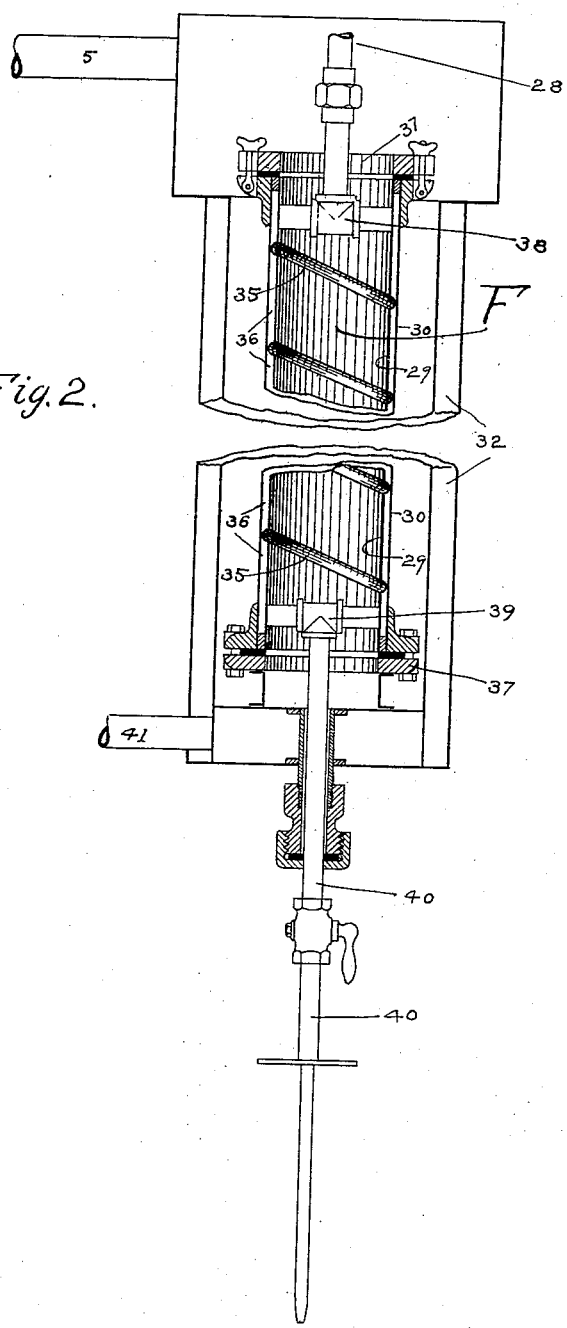

Fig. 2 is an enlarged view of the milk-cooling device.

Proceeding now to a more detailed description, to simplify this it may be well to consider separately the five elements which go to make up the complete apparatus—viz., the air-supply, the milk-supply, the aerator, the milk-delivery, and the cooling system.

The air-supply apparatus consists, essentially, of the blower D or other means of putting the air in motion, the air-filter E, and the cooler C, all with the proper connections for conducting atmospheric air through the filter and cooler to the atomizer. In the form which I prefer, the pipe 10, in connection with the open air, connects with a filter E. This filter is practically an enlargement of the air-pipe 10, and at its largest cross-section is divided by one or more diaphragms 15, of reticulated material, such as wire-netting, adapted to supporting one or more layers of sterilized lint-cotton, the purpose of the filter being to remove all dust or other impurities from the air. From the filter the air passes by pipe 9 to the blower D, which may be of any ordinary form, and consequently not necessary to be described. From the blower the air is forced through the pipe 11 to the cooler C. This cooler consists of a tank 20, adapted to holding a cooling liquid, in which is immersed an air-conduit, which latter forms part of the air-passage from the blower to the aerator. This conduit, while it may be of any form in which a large surface is presented to the cooling liquid, is preferably formed of two concentric cylinders 16 and 17, the inner cylinder 16 having on its outer surface a spiral rib, (indicated in the sectional view by the dotted lines 18,) the outer edge of which is in close contact with the inner surface of the outer cylinder 17, so that there is thus formed a continuous spiral passage between the two cylinders. By closing the annular spaces at the ends of the cylinders, excepting where connection is made to the inlet-pipe 11 and outlet-pipe 12, this spiral passage becomes continuous with the air-delivery pipe to the atomizer. The ends of the inner cylinder being open, the cooling liquid in which the conduit is immersed can fully circulate through and around the cylinders. At the lower end of the spiral conduit is a small pipe 21, placed in connection therewith for the purpose of removing the water of condensation given off by the cooling air. From the air-cooler the air is conducted by pipe 12 to the aerator A.

The milk to be treated is placed in the receiver B, which is connected by pipes 24 to the aerator A. The receiver may be of any form which readily permits thorough cleaning, and all connections to the atomizer should admit of ready disconnection for the same purpose. The receiver B should be placed above the outlet of the pipe 25 of the atomizer in order that the milk may naturally rise to and overflow at this outlet.

The aerator A consists of the aerating-chamber 33, in form preferably a vertical cylinder, made in detachable sections 21 22 23, as many as may be necessary to attain the desired height for the chamber without increasing the length of the sections beyond a size convenient for handling and cleaning. The top of the aerating-chamber is put in connection with the open air by a large pipe 14, by means of which the air which has been used in aerating is conducted away. At or near the bottom of the aerating-chamber is placed the atomizer. This may be of any form; but I prefer to use that kind in which the milk or other liquid atomized is brought into a finely-divided state by the action of the air alone as compared with methods where the milk is spurted through small orifices or dashed against screens, &c., since by the former method the milk is less violently agitated, with less breaking up of the fatty (or cream) globules, while a further advantage results from the fact that the number of pieces forming the atomizer is reduced to a minimum, thus facilitating the cleaning thereof.

The atomizer illustrated is that described in the United States Patent No. 481,088 to Chaney and Wires, dated August 16, 1892. Its construction, as I prefer to use it, is as follows: The air-supply passage 12 terminates in a short vertical casing 27, in which is placed a short vertical pipe 25, the latter connecting with the milk-supply pipe 24. Between the pipe 25 and casing 27 are placed spiral ribs or vanes 26, the purpose of which is to give a rotary motion to the current of air passing through the casing. The latter is partially closed by a cover 34, so that the air-blast is concentrated around the end of the delivery-pipe 25.

The milk after being aerated collects at the bottom of the aerator and is thence conducted by the pipe 28 to the milk-cooler F, Fig. 2. The milk-cooler, while somewhat similar in construction to the air-cooler C, has important differences, as will be pointed out. It consists of a tank 32, containing a cooling liquid, in which is immersed the milk-conduit, formed by two concentric cylinders 29 and 30, the inner one, 29, having a spiral rib 35, which being in contact with the inner surface of the outer cylinder, forms therewith the spiral milk-conduit 36. I prefer to form the rib on the inner cylinder by forcing outward a portion of the material thereof, so that the rib forms an integral part of the cylinder, the inner surface having a spiral groove corresponding to the ridge on the outer surface. In order that the cooling liquid may circulate through and around the cylinders, the annular openings at the ends thereof are closed by means of removable covers 37, the latter being removable in order that the cylinders may be separated. The pipe 28 from the aerator is connected to the upper end of the spiral conduit 36 by the T 38, and by a similar T 39 the lower part of conduit is connected to the milk-delivery pipe 40, whereby the milk is finally discharged.

By forming the milk-conduit as above stated I am able to separate easily the two cylinders 29 and 30. By pressing the spiral rib 35 on the cylinder 29 I obtain perfect continuity of surface and insure complete cleansing. A rib affixed to the outer surface of the cylinder would almost certainly present fine crevices from which it is difficult to remove the milk. Milk thus left becomes sour and a source of contamination to the milk thereafter passing through the cooler.

The milk as finally discharged may be disposed of as desired. For dairies supplying milk for domestic use I prefer to discharge the milk directly into previously-sterilized glass bottles, which are at once sealed.

The cooling system which I find best adapted for large dairies consists of a central reservoir G, Fig. 1, adapted to holding a quantity of water and melting ice. From or near the bottom of this reservoir a pipe 1 leads to a circulating-pump H, thence by pipe 2 to the T 3, where connections are made by the pipe 41 to the milk-cooler F and by the pipe 7 to the air-cooler C.

From or near the top of the milk-cooler tank 32 is connected the overflow-pipe 5, which returns to and discharges into the reservoir G. In like manner from or near the top of the air-cooler tank 20 is connected the overflow-pipe 8, which also returns to and discharges into the reservoir G, so that the warmest water in the tank is being continually returned to the central reservoir to be recooled and sent out again to the air and milk coolers.

Having thus described in detail the parts of my improved aerator and cooler, I will now describe the operation thereof. Having the reservoir G and the cooling-tanks 20 and 32 sufficiently filled with water, a supply of ice is placed in the reservoir G and the circulating-pump H put in operation, with the result that in a short time there is in both tanks a circulation of cold water at or near the temperature of melting ice. The blower D being then started a continuous current of atmospheric air is drawn in through the pipe 10, passes through the air-filter E, through the blower D, thence to the air-cooler C, thence by pipe 12 to the atomizer 13, issuing therefrom into the aerating-chamber 33 in a strong rotary blast and leaving the aerating-chamber at the top through the pipe 14. Now while the blower is in operation milk placed in the reservoir B is permitted to pass down through the pipe 24 and overflow at the upper end of the pipe 25. It is there met by the rotary blast of cold filtered air and thrown up into the aerating-chamber in the form of fine spray or mist, is there thoroughly permeated by the air, which then passes out at the top at the pipe 14, while the aerated and cooled milk settles to the sides and thence runs to the bottom of the aerating-chamber, whence it is conducted by pipe 28 to the milk-cooler, where it is still further reduced in temperature and finally discharged by the outlet-pipe 40.

In the means which I employ and have described it will be noted that the milk is atomized by the action of the air alone, that the air does not remain in contact with the milk, but is continually passing through and from it, that no moving parts come in contact with the milk, that the milk is not brought into violent contact with any part of the apparatus, that the parts in contact with the milk may easily be disconnected or assembled, and that while disconnected they are readily accessible for cleaning.

Having thus fully described my invention, what I claim as new, and desire to secure by Letters Patent, is—

1. In a milk aerator and cooler the combination of an aerating-chamber having separate outlets for the air and milk with an atomizer having an air-supply pipe and a milk-supply pipe separably connected thereto.

2. In a milk aerator and cooler the combination of an aerating-chamber having separate outlets for the air and milk, and an atomizer contained therein having an air-supply pipe and a milk-supply pipe connected thereto, with a blower.

3. In a milk aerator and cooler, the combination of an air-cooler, an air-filter and a blower with an aerating-chamber, having separate outlets for the air and milk, and having an atomizer contained therein, and an air-supply pipe and a milk-supply pipe connected to said atomizer.

4. In a milk aerator and cooler the combination of an aerating-chamber having separate outlets for the air and milk, a milk-delivery passage therefrom, an atomizer contained therein, an air-supply pipe and a milk-supply pipe connected to said atomizer, a blower, an air-cooler and an air-filter connected with said air-supply pipe and a milk-cooler connected with said milk-delivery passage.

5. In a milk aerator and cooler the combination of an aerating-chamber having separate outlets for the air and milk, an atomizer having an air-supply pipe and a milk-supply pipe connected thereto, a blower, and a milk-delivery conduit with a milk-cooler.

6. In a milk aerator and cooler the combination of a milk-cooler, an air-cooler, and a central cooling-reservoir with means for forcing a cooling liquid from said reservoir through said coolers and returning thereto.

DAVID P. COX.

Witnesses:
T. W. MOORHEAD,
CHARLES GERSTMEYER.